US011142250B2

(12) United States Patent
Kiyoshita et al.

(10) Patent No.: US 11,142,250 B2
(45) Date of Patent: Oct. 12, 2021

(54) VEHICLE BODY STRUCTURE

(71) Applicant: Mazda Motor Corporation, Hiroshima (JP)

(72) Inventors: Daisuke Kiyoshita, Hiroshima (JP); Yoshikazu Nishimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 59 days.

(21) Appl. No.: 16/794,274

(22) Filed: Feb. 19, 2020

(65) Prior Publication Data

US 2020/0269923 A1 Aug. 27, 2020

(30) Foreign Application Priority Data

Feb. 27, 2019 (JP) .............................. JP2019-033869

(51) Int. Cl.
*B62D 25/02* (2006.01)
*B62D 25/16* (2006.01)
*B62D 27/04* (2006.01)

(52) U.S. Cl.
CPC ............. *B62D 25/02* (2013.01); *B62D 25/16* (2013.01); *B62D 27/04* (2013.01)

(58) Field of Classification Search
CPC ........ B62D 25/02; B62D 25/16; B62D 27/04; B62D 25/04; B62D 25/087; B62D 25/088; B62D 25/08
USPC ........................................ 296/193.05, 203.01
See application file for complete search history.

(56) References Cited

U.S. PATENT DOCUMENTS

| | | | | |
|---|---|---|---|---|
| 4,542,934 A * | 9/1985 | Komatsu | ............... | B62D 25/082 296/198 |
| 4,973,103 A * | 11/1990 | Imajyo | .................... | B62D 25/02 296/191 |
| 6,364,405 B1 * | 4/2002 | Kim | ...................... | B62D 25/087 296/203.01 |
| 7,717,496 B2 * | 5/2010 | Ebina | ..................... | B62D 43/02 296/187.12 |
| 7,959,217 B2 * | 6/2011 | Onuma | .................. | B62D 25/04 296/187.12 |
| 8,007,037 B2 * | 8/2011 | Wolkersdorfer | ....... | B62D 25/02 296/209 |
| 8,029,043 B2 * | 10/2011 | Baumann | ............... | B62D 25/04 296/187.12 |
| 8,388,046 B2 * | 3/2013 | Hutter | .................... | B62D 25/02 296/193.05 |
| 9,783,241 B2 * | 10/2017 | Ishihara | ................. | B62D 25/08 |

(Continued)

FOREIGN PATENT DOCUMENTS

| | | |
|---|---|---|
| JP | 5776451 B2 | 9/2015 |
| JP | 5790333 B2 | 10/2015 |

*Primary Examiner* — Pinel E Romain
(74) *Attorney, Agent, or Firm* — Xsensus LLP

(57) ABSTRACT

The vehicle body structure including an inner rein coupled to a first portion of a vibration source in a vehicle and a component constituting a vehicle body; an outer rein coupled to the component and a second portion different from the first portion of the vibration source; and a damping structure arranged between the inner rein and the outer rein and configured to dampen vibrations transmitted along the inner rein and the outer rein, wherein the inner rein includes a portion that interrupts transmission of the vibration transmitted along the inner rein, and is connected to the second reinforcing member via the damping structure.

19 Claims, 6 Drawing Sheets

(56) References Cited

U.S. PATENT DOCUMENTS

| | | | | |
|---|---|---|---|---|
| 2008/0246312 A1* | 10/2008 | Katoh | ............... | B62D 25/04 |
| | | | | 296/203.04 |
| 2013/0049391 A1 | 2/2013 | Kurogi et al. | | |
| 2013/0049392 A1 | 2/2013 | Kurogi et al. | | |
| 2013/0049408 A1* | 2/2013 | Kurogi | ............ | B62D 25/025 |
| | | | | 296/209 |
| 2013/0249243 A1* | 9/2013 | Lee | ............... | B62D 25/082 |
| | | | | 296/187.03 |
| 2017/0305470 A1* | 10/2017 | Sato | ............ | B62D 27/02 |

\* cited by examiner

VEHICLE BODY STRUCTURE

CROSS-REFERENCE TO RELATED APPLICATION

The present application claims priority to JP 2019-033869, filed Feb. 27, 2019, the entire contents of which are incorporated herein by reference.

TECHNICAL FIELD

The present disclosure relates to a vehicle body structure.

BACKGROUND

A frame structure constructed of high rigid frames, for which a closed cross-sectional structure, a reinforcing member, and the like are used to improve rigidity of a vehicle body, has conventionally been known. While such a frame structure is highly rigid, vibrations are easily transmitted in the frame structure. For example, there is a case where, during travel of a vehicle, the frame structure tends to serve as a vibration transmission path from a wheel house as a vibration source to a vehicle cabin. In order to suppress the vibrations that are transmitted along the frame structure, a structure in which a damping member is interposed in the frame structure is disclosed in Patent document 1, Patent document 2, and the like.

For example, in a vehicle body structure disclosed in Patent document 1, a frame, rigidity of which is increased by the closed cross-sectional structure, is formed from a cross-member at the rear of the vehicle cabin to the wheel house, and a damping structure that couples opposing frame components is arranged in the frame. The damping structure includes: a bulk head that is welded to one of the frame components; and a viscoelastic member that is interposed between the bulk head and the other frame component, and dampens the vibrations of the frame by the viscoelastic member.

PATENT DOCUMENTS

[Patent document 1] Japanese Patent No. 5,776,451
[Patent document 2] Japanese Patent No. 5,790,333

SUMMARY

While the vehicle body structure as described above has a high vibration suppression effect, the damping structure has to be provided for each of the frames. For this reason, from perspectives of a weight reduction of a vehicle body and cost cut, a damping structure with improved efficiency is requested.

The structure described in the present disclosure has been made in view of the above circumstance and therefore has a purpose of providing a vehicle body structure capable of suppressing a vibration transmitted from a vibration source to a vehicle body further efficiently while improving rigidity of the vehicle body.

In order to solve the above problem, a vehicle body structure according to the present disclosure includes: a first reinforcing member that couples a first portion constituting a vibration source in a vehicle and a component constituting a vehicle body to reinforce the vehicle body; a second reinforcing member that couples a second portion different from the first portion in the vibration source and the component to reinforce the vehicle body; a meeting section where a transmission path of a vibration, which is transmitted along the first reinforcing member, and a transmission path of a vibration, which is transmitted along the second reinforcing member, meet; and a damping section that is arranged in the meeting section and dampens the vibrations transmitted along the first reinforcing member and the second reinforcing member. The first reinforcing member has an interrupting section that interrupts transmission of the vibration transmitted along the first reinforcing member, and is connected to the second reinforcing member via the damping section near the interrupting section.

The vehicle body structure with such a configuration includes the first reinforcing member and the second reinforcing member that couple the two different portions (the first portion and the second portion) of the vibration source to the component constituting the vehicle body to reinforce the vehicle body. The transmission path of the vibration, which is transmitted along the first reinforcing member, and the transmission path of the vibration, which is transmitted along the second reinforcing member, are met in the meeting section. Here, the vibration that is transmitted along the first reinforcing member is interrupted by the interrupting section in an intermediate portion of the meeting section, and is concentrated on the interrupting section. The vibration that is concentrated on the interrupting section is dampened by the damping section near the interrupting section. Meanwhile, the vibration that is transmitted along the second reinforcing member is also dampened by the damping section. However, the remaining vibration that cannot be dampened by the damping section returns to the vibration source along the first reinforcing member. Thus, it is possible to suppress the transmission of the vibration to the vehicle body. In this way, it is possible to further efficiently suppress the vibration transmitted from the vibration source to the vehicle body while improving rigidity of the vehicle body.

In the above vehicle body structure, the interrupting section is preferably arranged at the same position as the damping section or at a position close to the vibration source from the damping section.

With such a configuration, it is possible to reliably dampen the vibration concentrated on the interrupting section by the damping section without dispersing the vibration.

In the above vehicle body structure, the vibration source is preferably a rear wheel house that accommodates a rear wheel.

Thus, it is possible to improve the rigidity of the vehicle body around the rear wheel house and to further efficiently suppress the vibrations, which are generated in the rear wheel house during travel of the vehicle and are transmitted along the first reinforcing member and the second reinforcing member, by the damping section.

In the above vehicle body structure, the component is preferably a side plate that constitutes a side surface of the vehicle body, the first portion is preferably a wheel house inner that is arranged on an inner side of the vehicle body in the rear wheel house, and the first reinforcing member is preferably an inner rein that is coupled to the wheel house inner and an inner surface of the side plate.

With such a configuration, on the inner side of the vehicle body, the vibration that is generated in the rear wheel house is transmitted along the inner rein as the first reinforcing member, and is interrupted by the interrupting section in the intermediate portion of the meeting section, and is dampened by the damping section near the interrupting section.

Thus, it is possible to further efficiently suppress the vibration while suppressing a vibration transmission range on the inside of a vehicle cabin.

In the above vehicle body structure, the second reinforcing member preferably constitutes a closed cross-sectional structure with the component, the damping section is preferably formed with a damping structure that is formed in the closed cross-sectional structure, and the damping structure preferably includes: a coupling member that is fixed to an inner surface of the second reinforcing member; and a vibration damping member that is interposed between the coupling member and the component to dampen the vibration.

With such a configuration, the second reinforcing member constitutes the closed cross-sectional structure with the component. Thus, it is possible to further improve the rigidity of the vehicle body. In addition, in the closed cross-sectional structure, the vibration that is transmitted along the second reinforcing member is transmitted to the vibration damping member via the coupling member in the damping structure constituting the damping section, and is efficiently dampened by the vibration damping member. As a result, it is possible to further improve the rigidity of the vehicle body and achieve further efficient dampening.

In the above vehicle body structure, with the component, the first reinforcing member preferably constitutes a first annular structure section that has an annular closed cross-sectional structure when seen from front of the vehicle body, with the component, the second reinforcing member preferably constitutes a second annular structure section that has an annular closed cross-sectional structure in a side view of the vehicle body, and on a far side in the meeting section from the vibration source, a shared portion shared by the first annular structure section and the second annular structure section is preferably provided.

With such a configuration, the two annular structure sections (the first annular structure section and the second annular structure section), which are formed with the annular closed cross-sectional structures, are formed in the vehicle body. Thus, the rigidity of the vehicle body is further improved. In addition, since the shared portion by these two annular structure sections is positioned on the far side in the meeting section from the vibration source. Thus, it is possible to reliably suppress the transmission of the vibration from the vibration source to the shared portion by the damping section provided in the meeting section. Furthermore, in the two annular structure sections, the vibrations are dampened in the common damping section. Thus, it is possible to further efficiently dampen the vibrations.

In the above vehicle body structure, the shared portion is preferably located above a lower end of a side window opening that is formed in a side portion of the vehicle body.

With such a configuration, it is possible to prevent the transmission of the vibration to ears of an occupant.

According to the vehicle body structure of the present disclosure, it is possible to further efficiently suppress the vibration transmitted from the vibration source to the vehicle body while improving the rigidity of the vehicle body.

DETAILED DESCRIPTION

A description will hereinafter be made on an embodiment of the present invention with reference to the accompanying drawings.

Figure 1:
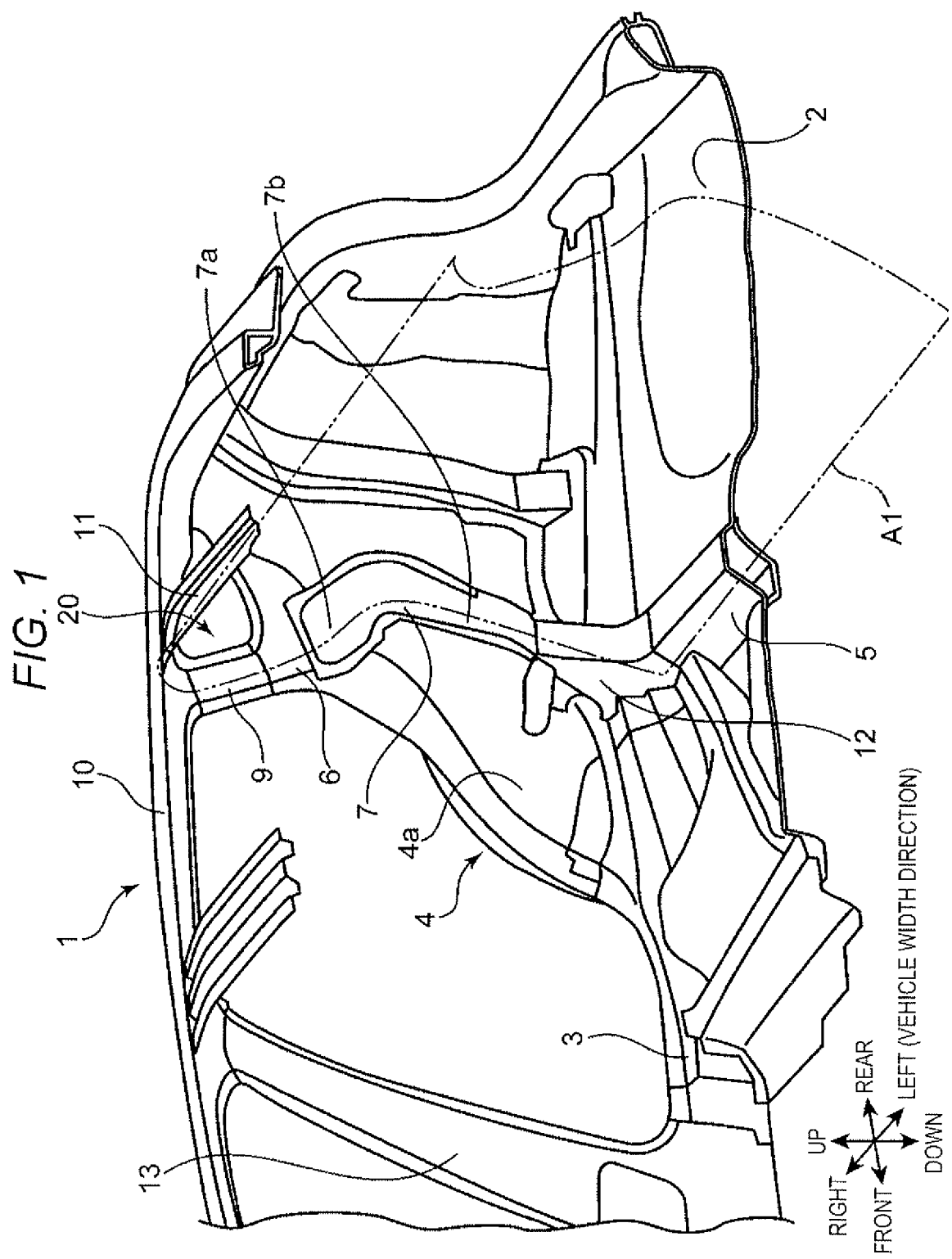
FIG. 1 is a perspective view in which a portion around a rear wheel house in a vehicle body structure according to an embodiment of the present disclosure is seen from the inside of a vehicle cabin.
Figure 2:
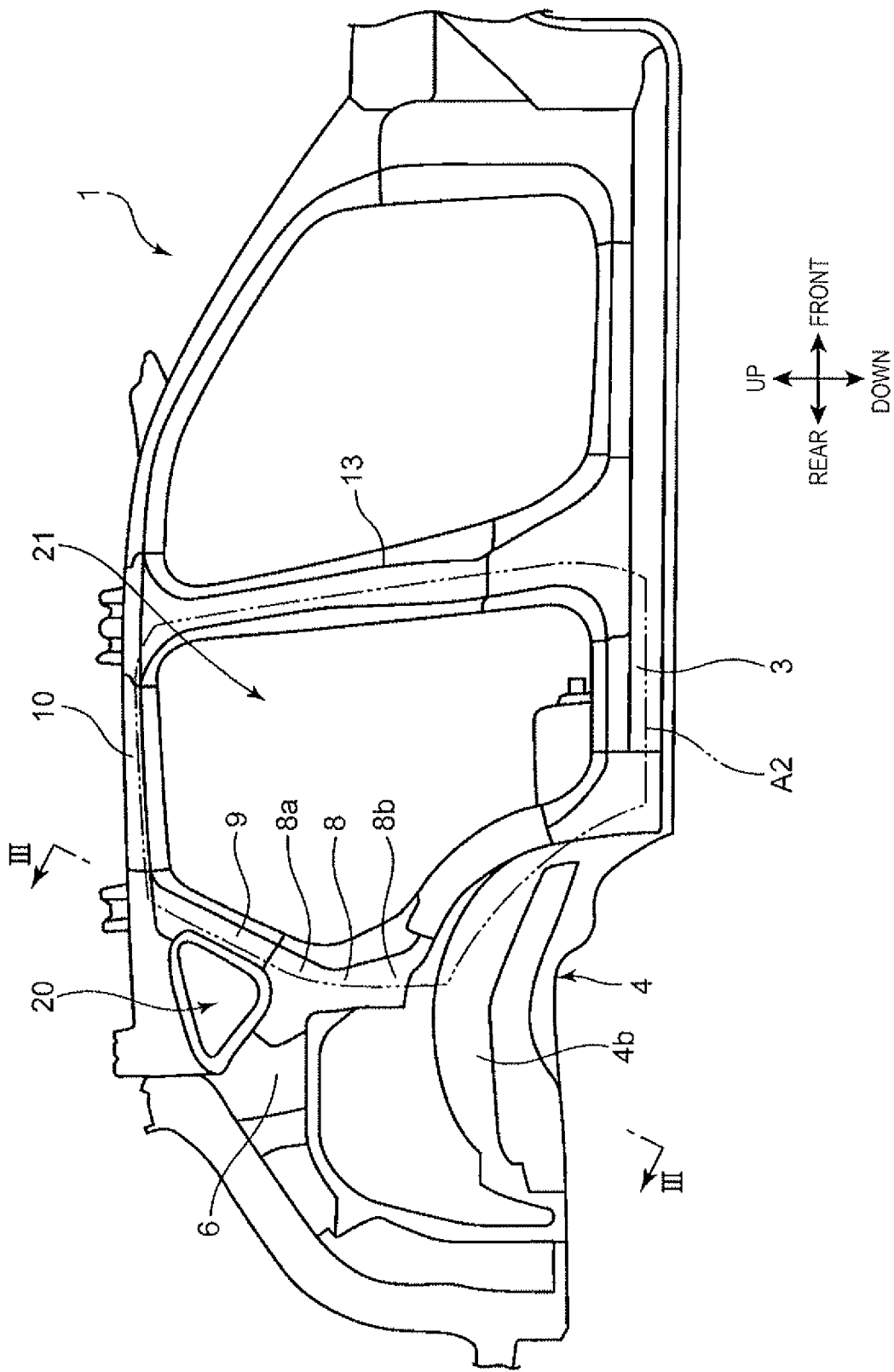
FIG. 2 is a view in which the rear wheel house and a longitudinal annular structure in the vehicle body structure illustrated in FIG. 1 are seen from an outer surface of a vehicle.

FIG. 1 is a perspective view in which a portion around a rear wheel house in a vehicle body structure according to the embodiment of the present invention is seen from the inside of a vehicle cabin. FIG. 2 is a view in which the rear wheel house and a longitudinal annular structure in the vehicle body structure illustrated in FIG. 1 are seen from an outer surface of a vehicle.

Note that directional indices ("front", "rear", "left", "right", "up", and "down") in the drawings are set with the vehicle being a reference, and directions used in the following description will be based on these indices unless otherwise particularly mentioned. In addition, in order to enlarge a portion around a rear wheel house 4, FIG. 1 only illustrates a right portion of a vehicle body 1.

As illustrated in FIGS. 1 to 2, the vehicle body 1, to which the vehicle body structure according to this embodiment is applied, includes: a floor panel 2 that constitutes a floor surface of the vehicle body 1; a pair of floor side frames 3 that extend in a vehicle longitudinal direction on both sides of the floor panel 2 in a width direction of the vehicle (a right-left direction of the vehicle and will hereinafter be described as a "vehicle width direction"); a pair of the rear wheel houses 4, in each of which a rear wheel (not illustrated) is accommodated; a crossmember 5 that extends in the vehicle width direction at a position between the pair of the rear wheel houses 4; and a pair of side plates 6 that constitute side surfaces of the vehicle body 1.

In this embodiment, attention is paid to vibrations generated in the rear wheel during travel of the vehicle, and the rear wheel house 4 that accommodates the rear wheel is considered as a vibration source.

Figure 3:
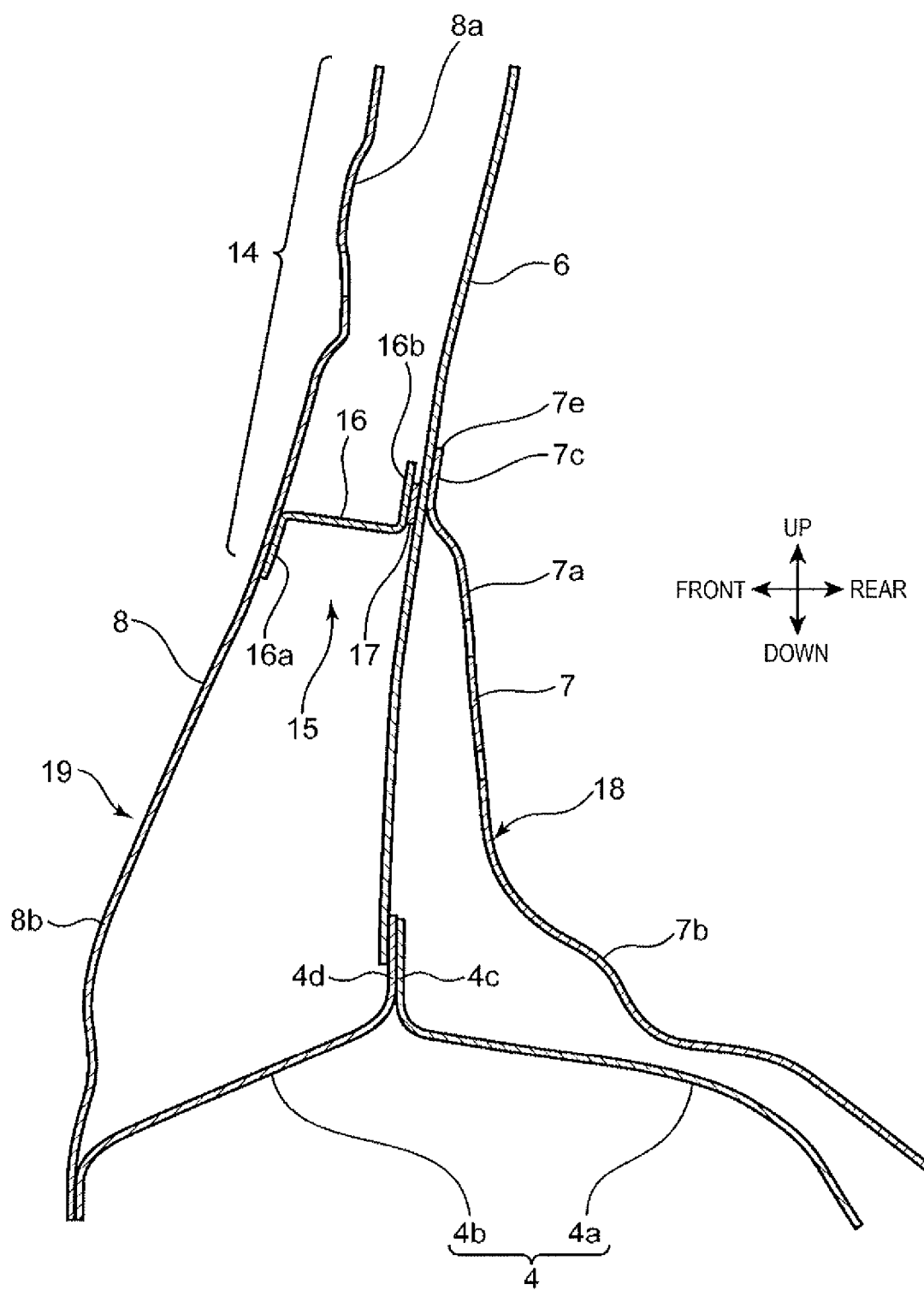
FIG. 3 is a cross-sectional view that is taken along line III-III in FIG. 2.

As illustrated in FIGS. 1 to 3, the rear wheel house 4 includes, as a first portion, a wheel house inner 4a that is positioned inward in the vehicle width direction of the vehicle body 1 and, as a second portion that differs from the first portion, a wheel house outer 4b that is positioned outward in the vehicle width direction of the vehicle body 1. Each of the wheel house inner 4a and the wheel house outer 4b is a plate-shaped member that is arranged along the vehicle longitudinal direction and is bulged in a semicircular shape so as to be projected upward. The wheel house inner 4a and the wheel house outer 4b respectively have flanges 4c, 4d, each of which extends in a circular shape that is projected outward from a circular outer circumferential surface. In a state where the wheel house inner 4a and the wheel house outer 4b are placed over each other in the vehicle width direction, these flanges 4c, 4d are joined by welding or the like. In this way, the semicircular rear wheel house 4 that includes the wheel house inner 4a and the wheel house outer 4b is constructed.

In addition, in this embodiment, a lower end of the side plate 6 is joined to a portion where the flanges 4c, 4d are placed over each other by welding or the like.

As illustrated in FIGS. 1 to 3, in the vehicle body 1, the vehicle body structure according to this embodiment further includes an inner rein 7 as a first reinforcing member, an outer rein 8 as a second reinforcing member, a meeting section 14, and a damping structure 15 as a damping section. The inner rein 7 and the outer rein 8 are provided in a manner to couple the rear wheel house 4 and the side plate 6 on inner and outer sides of the vehicle body 1, and reinforce the vehicle body 1 around the rear wheel house 4.

Figure 5:
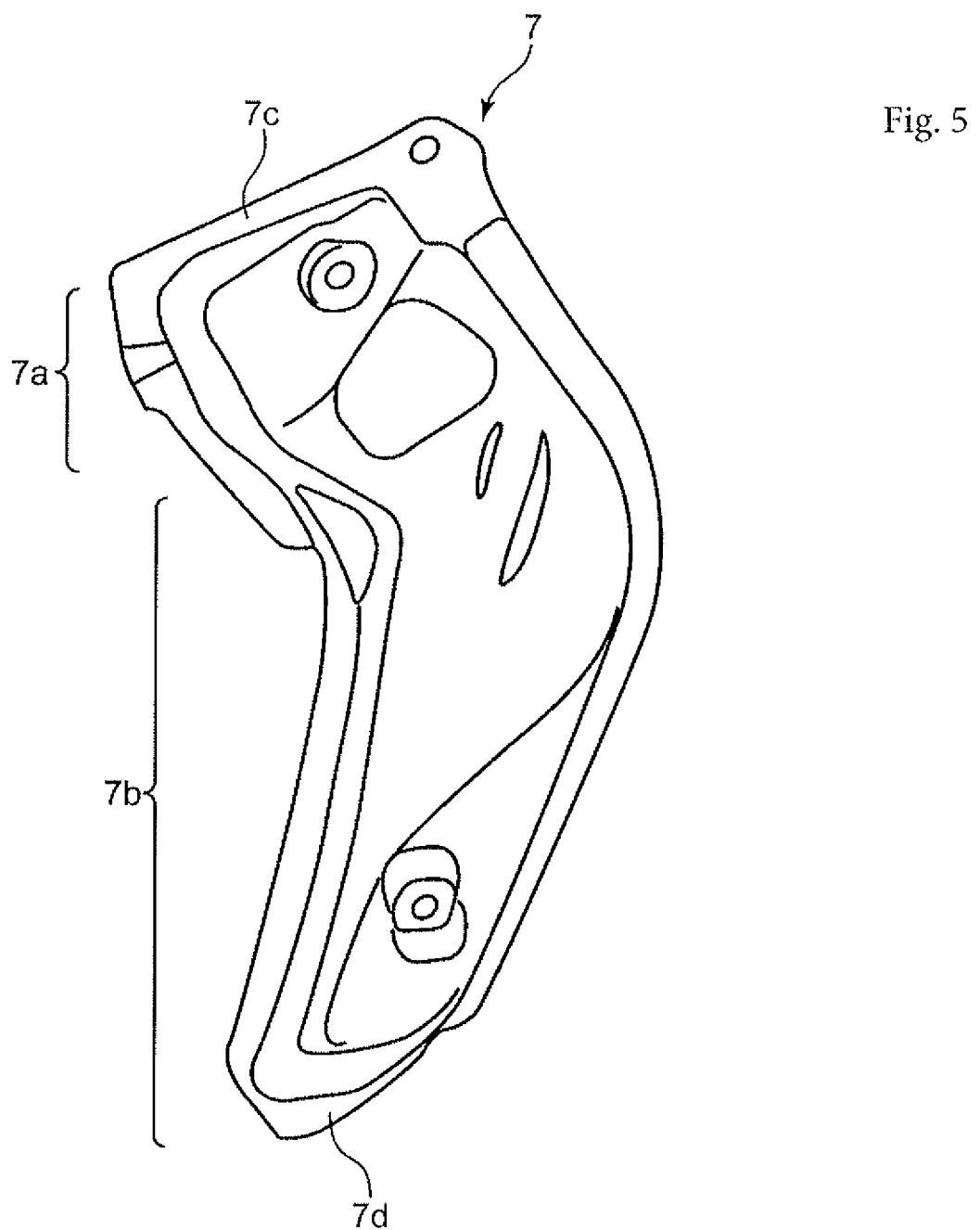
FIG. 5 is a perspective view of an inner rein illustrated in FIG. 1.

As illustrated in FIGS. 1, 3, and 5, the inner rein 7 is the reinforcing member that couples the wheel house inner 4a of the rear wheel house 4 and the side plate 6 as a component constituting the side surface of the vehicle body 1 and that reinforces the vehicle body 1. The inner rein 7 has: an upper section 7a that opposes the side plate 6; and a lower section 7b that is located under the upper section 7a and extends toward a vehicle inner side (in the vehicle left direction) along the wheel house inner 4a.

On an outer peripheral edge of the upper section 7a of the inner rein 7, a flange 7c that expands outward from the outer peripheral edge is formed. When the flange 7c is joined to the side plate 6 by welding or the like, the upper section 7a of the inner rein 7 is coupled to the side plate 6.

On an outer peripheral edge of the lower section 7b of the inner rein 7, a flange 7d that expands outward from the outer peripheral edge is formed. When the flange 7d is joined to the wheel house inner 4a by welding or the like, the lower section 7b of the inner rein 7 is coupled to the wheel house inner 4a.

In this embodiment, the inner rein 7 is a plate-shaped member that is bulged toward the vehicle inner side and, as illustrated in FIG. 3, constitutes an inner-side closed cross-sectional structure 18 with the side plate 6 and the wheel house inner 4a.

Figure 6:
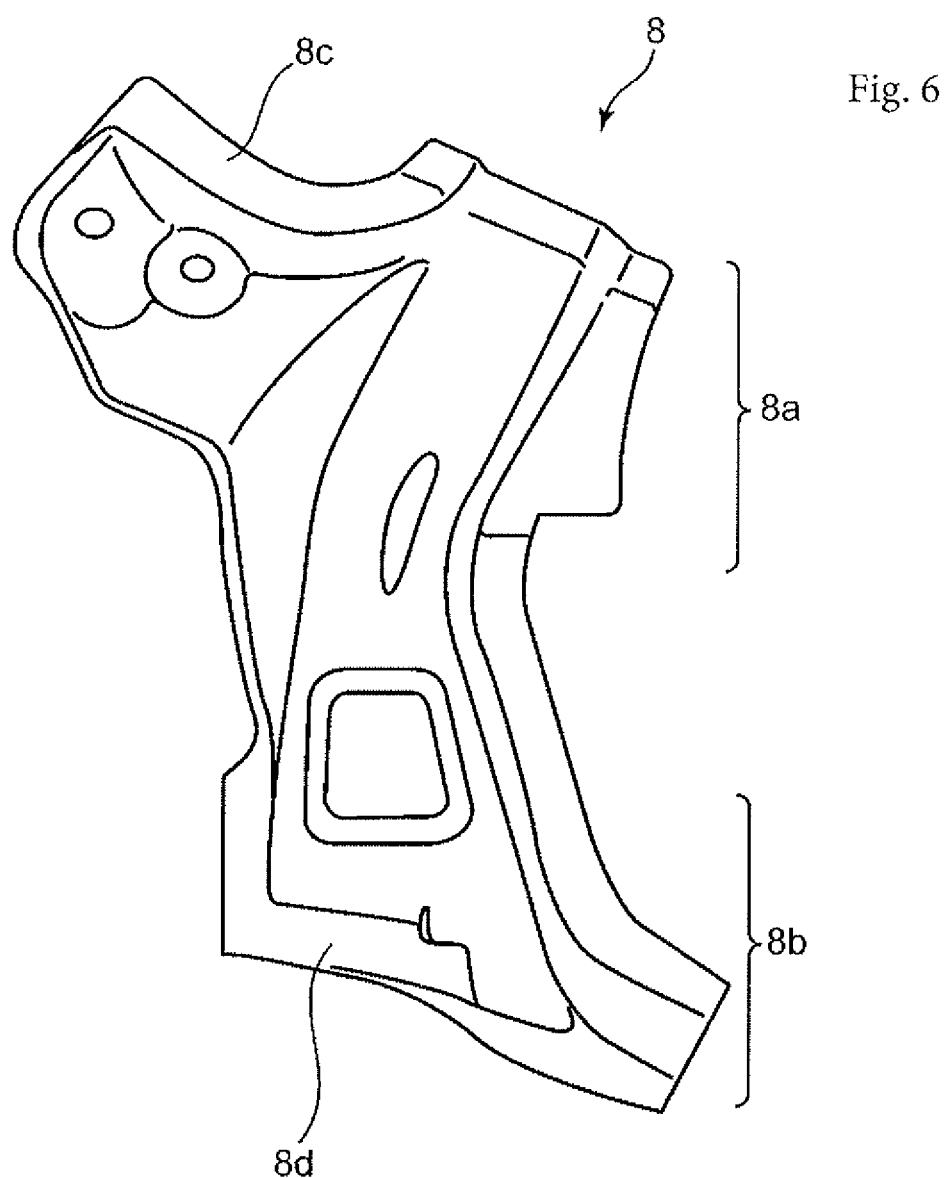
FIG. 6 is a perspective view of the outer rein illustrated in FIG. 2.

As illustrated in FIGS. 2, 3, and 6, the outer rein 8 is the reinforcing member that couples the wheel house outer 4b of the rear wheel house 4 and the side plate 6 and reinforces the vehicle body 1. The outer rein 8 has: an upper section 8a that opposes the side plate 6; and a lower section 8b that is located under the upper section 8a and extends toward a vehicle outer side (in the vehicle right direction) along the wheel house outer 4b.

On an outer peripheral edge of the upper section 8a of the outer rein 8, a flange 8c that expands outward from the outer peripheral edge is formed. When the flange 8c is joined to the side plate 6 by welding or the like, the upper section 8a of the outer rein 8 is coupled to the side plate 6.

On an outer peripheral edge of the lower section 8b of the outer rein 8, a flange 8d that expands outward from the peripheral edge is formed. When the flange 8d is joined to the wheel house outer 4b by welding or the like, the lower section 8b of the outer rein 8 is coupled to the wheel house outer 4b.

In this embodiment, the outer rein 8 is a plate-shaped member that is bulged toward the vehicle outer side and, as illustrated in FIG. 3, constitutes an outer-side closed cross-sectional structure 19 with the side plate 6 and the wheel house outer 4b.

As illustrated in FIG. 3, the meeting section 14 is a portion where a transmission path of the vibration, which is transmitted along the inner rein 7, and a transmission path of the vibration, which is transmitted along the outer rein 8, meet.

In this embodiment, the meeting section 14 is constructed of the side plate 6, the upper section 7a of the inner rein 7, which opposes the side plate 6, and the upper section 8a of the outer rein 8, which opposes the side plate 6.

The inner rein 7 has an interrupting section 7e that interrupts the transmission of the vibration along the inner rein 7 in an intermediate portion of the meeting section 14. In this embodiment, the interrupting section 7e of the inner rein 7 is formed with an upper end of the upper section 7a of the inner rein 7 (more specifically, the flange 7c near the upper end of the upper section 7a).

The damping structure 15 is arranged in the meeting section 14 and is configured to dampen the vibrations transmitted along the inner rein 7 and the outer rein 8. The damping structure 15 in this embodiment is arranged in the outer-side closed cross-sectional structure 19.

The damping structure 15 includes: a coupling member 16 that is coupled to an inner surface of the outer rein 8; and a vibration damping member 17 that is interposed between the coupling member 16 and the side plate 6 to dampen the vibration.

The coupling member 16 is a plate-shaped member having such a magnitude of rigidity that the vibration can be transmitted, and has a lower bent section 16a and an upper bent section 16b. The lower bent section 16a is a portion that is bent downward to oppose the inner surface of the outer rein 8, and is fixed to the outer rein 8 by welding or the like. The upper bent section 16b is a portion that is bent upward to oppose the side plate 6.

The vibration damping member 17 needs to have viscoelasticity that can convert vibration energy into thermal energy and can thereby dampen the vibration. More specifically, under a condition that a temperature is 20° C. and a frequency of an excitation force is 30 Hz, the vibration damping member 17 needs to have such a physical property that a storage elastic modulus is equal to or lower than 500 MPa and a loss factor is equal to or larger than 0.2. As the vibration damping member 17, a viscoelastic member such as damping glue. The vibration damping member 17 is interposed between the upper bent section 16b of the coupling member 16 and the side plate 6.

A portion near the interrupting section 7e of the inner rein 7 is connected to the outer rein 8 via the damping structure 15.

In the vehicle body structure of this embodiment, as illustrated in FIG. 1, together with the side plate 6, the inner rein 7 constitutes a vehicle width direction annular structure A1 as the first annular structure section that has an annular closed cross-sectional structure when seen from front of the vehicle body 1.

The vehicle width direction annular structure A1 is the annular closed cross-sectional structure that is configured to include: a pair of the inner reins 7 arranged on both sides in the vehicle width direction; the pair of the side plates 6, to which the upper sections 7a of the pair of the inner rein 7 are coupled; a pair of rear pillars 9 that are coupled to upper ends of the pair of the side plates 6; a pair of roof side rails 10 that are coupled to upper ends of the pair of the rear pillars 9 and extend in the vehicle longitudinal direction; a roof rein 11 that couples the pair of the roof side rails 10 and extends in the vehicle width direction; a pair of suspension housings 12 that are coupled to the lower sections 7b of the pair of the inner reins 7; and the crossmember 5, both ends of which are coupled to the pair of the suspension housings 12.

In the vehicle width direction annular structure A1, a closed cross section is formed as follows by the above members. That is, with the side plate 6 and the wheel house inner 4a, the inner rein 7 constitutes the inner-side closed cross-sectional structure 18 as described above. The side plate 6 forms a closed cross section with the upper section 8a of the outer rein 8 illustrated in FIG. 3. The rear pillar 9 has a closed cross section in which an outer pillar and an inner pillar in hat-shaped cross-sectional shapes are joined to each other. The roof side rail 10 has a rectangular cylindrical shape and has a closed cross section. The roof rein 11 forms a closed cross section with a roof panel, which is not illustrated. The suspension housing 12 forms a closed cross section with the wheel house inner 4a. The crossmember 5 constitute a closed cross section with the floor panel 2. When these plural closed cross sections are coupled in an annular shape, the vehicle width direction annular structure A1 that has the annular closed cross-sectional structure as described above is constructed.

In the vehicle body structure of this embodiment, as illustrated in FIG. 2, together with the side plate 6, the outer rein 8 constitutes a vehicle longitudinal direction annular structure A2 as the second annular structure section that has an annular closed cross-sectional structure when seen in a side view of the vehicle body 1. On both of the side surfaces of the vehicle, the longitudinal annular structure A2 is formed in a manner to surround a rear doorway 21.

The vehicle longitudinal direction annular structure A2 is an annular closed cross-sectional structure that is configured to include: the outer rein 8; the side plate 6, to which the upper section 8a of the outer rein 8 is coupled; the rear pillar 9 that is coupled to the upper end of the side plate 6 and the upper section 8a of the outer rein 8 and extends upward; the roof side rail 10 that is coupled to an upper end of the rear pillar 9 and extends in the vehicle longitudinal direction; a center pillar 13 that extends downward from the roof side rail 10 on a vehicle front side of the rear pillar 9; and a floor side frame 3 that extends in the vehicle longitudinal direction and couples a lower end of the center pillar 13 and the wheel house outer 4b.

In the vehicle longitudinal direction annular structure A2, a closed cross section is formed as follows by the above members. That is, with the side plate 6 and the wheel house outer 4b, the outer rein 8 constitutes the outer-side closed cross-sectional structure 19 as described above. As described above, the side plate 6 forms the closed cross section with the upper section 8a of the outer rein 8 illustrated in FIG. 3. As described above, each of the rear pillar 9 and the roof side rail 10 has the closed cross section. Similar to the rear pillar 9, the center pillar 13 also has a closed cross section in which the outer pillar and the inner pillar in the hat-shaped cross-sectional shapes are joined. The floor side frame 3 has a rectangular cylindrical shape and has a closed cross section.

On a far side in the meeting section 14 from the rear wheel house 4 (that is, on an opposite side (an upper side) of the rear wheel house 4 as the vibration source from the damping structure 15 in FIG. 3), the vehicle body structure in this embodiment has the rear pillar 9, which is illustrated in FIGS. 1 to 2, as a shared portion that is shared by the vehicle width direction annular structure A1 and the vehicle longitudinal direction annular structure A2.

Figure 4:
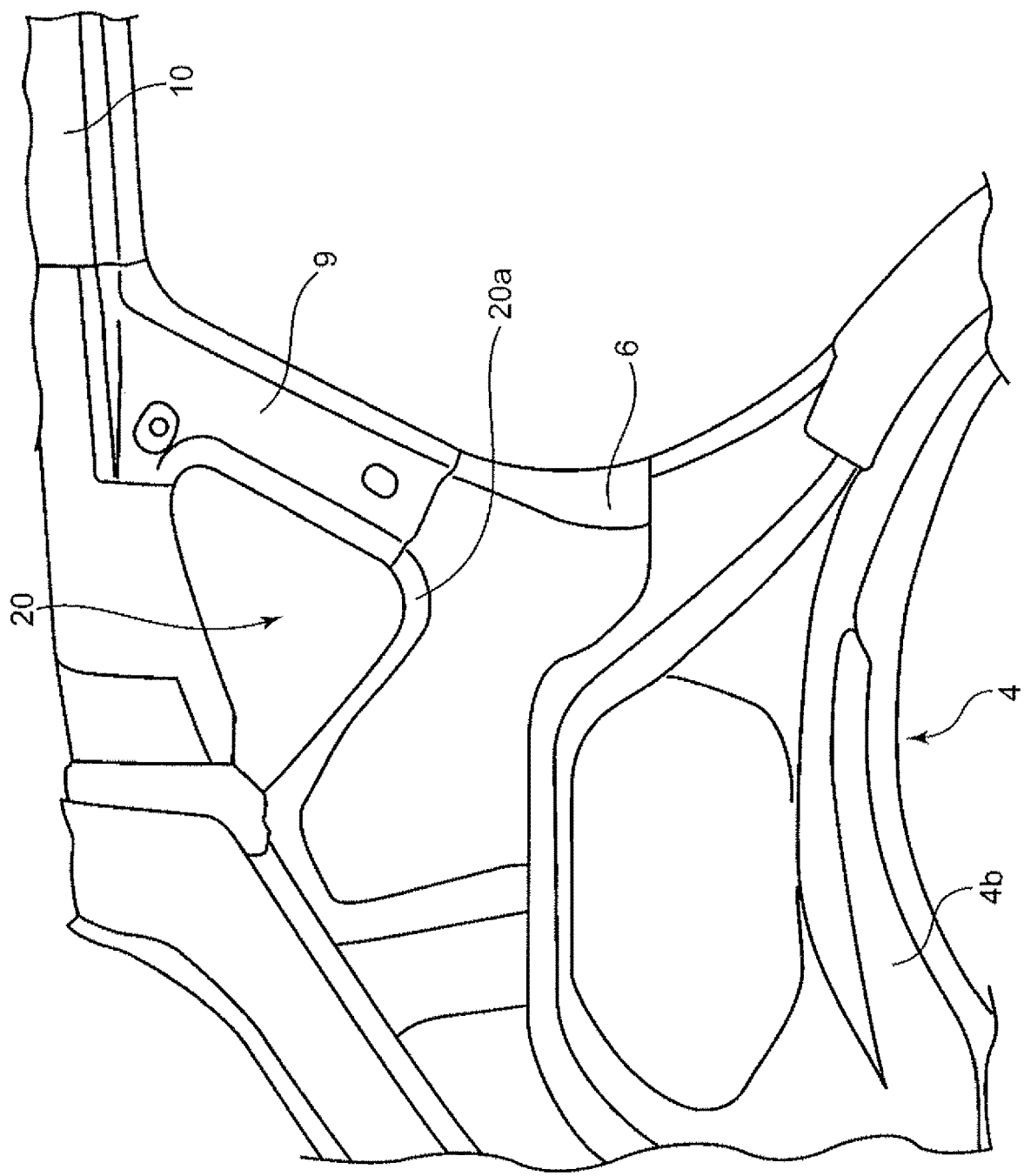
FIG. 4 is a view of a state where an outer rein in the portion around the rear wheel house illustrated in FIG. 2 is removed.

As illustrated in FIG. 2 and FIG. 4, the rear pillar 9 as the shared portion can prevent the transmission of the vibration to an occupant when being arranged such that the rear pillar 9 is positioned above a lower end 20a of a quarter window opening 20 that is a side window opening formed in a side portion of the vehicle body 1. However, a lower end position of the rear pillar 9 only needs to be appropriately determined by comparing a vibration transmission prevention effect and a design request. Thus, as long as there is no problem of the vibration transmission to the occupant, the rear pillar 9 may slightly be positioned lower than the lower end 20a of the quarter window opening 20.

Characteristics of this Embodiment (1)

The vehicle body structure according to this embodiment includes the inner rein 7 as the first reinforcing member, the outer rein 8 as the second reinforcing member, the meeting section 14, and the damping structure 15 as the damping section. The inner rein 7 couples the wheel house inner 4a, which constitutes the rear wheel house 4 of the vehicle, and the side plate 6, which constitutes the vehicle body 1, and reinforces the vehicle body 1. The outer rein 8 couples the wheel house outer 4b, which is the different portion from the wheel house inner 4a in the rear wheel house 4, and the side plate 6, and reinforces the vehicle body 1. In the meeting section 14, the transmission path of the vibration, which is transmitted along the inner rein 7, and the transmission path of the vibration, which is transmitted along the outer rein 8, meet. The damping structure 15 is arranged in the meeting section 14 and dampens the vibrations transmitted along the inner rein 7 and the outer rein 8. The inner rein 7 has the interrupting section 7e that interrupts the transmission of the vibration along the inner rein 7 in the intermediate portion of the meeting section 14. In addition, the portion near the interrupting section 7e of the inner rein 7 is connected to the outer rein 8 via the damping structure 15.

The vehicle body structure in such a configuration includes the inner rein 7 and the outer rein 8 that reinforce the vehicle body 1 by coupling the two different portions (the wheel house inner 4a and the wheel house outer 4b) of the rear wheel house 4 to the side plate 6 that constitutes the vehicle body 1. The transmission path of the vibration, which is transmitted along the inner rein 7, and the transmission path of the vibration, which is transmitted along the outer rein 8, meet in the meeting section 14 illustrated in FIG. 3. Here, the vibration that is transmitted along the inner rein 7 is interrupted in the intermediate portion of the meeting section 14 by the interrupting section 7e and is concentrated on the interrupting section 7e. The vibration that is concentrated on the interrupting section 7e is dampened by the damping structure 15 as the damping section near the interrupting section 7e. Meanwhile, the vibration that is transmitted along the outer rein 8 is also dampened by the damping structure 15. However, the remaining vibration that cannot be dampened by the damping structure 15 returns to the rear wheel house 4 along the inner rein 7. Thus, it is possible to suppress the transmission of the vibration to the vehicle body 1. In this way, it is possible to suppress the vibration transmitted from the rear wheel house 4 to the vehicle body 1 further efficiently while improving rigidity of the vehicle body 1.

Here, the interrupting section 7e is preferably arranged at the same position as the damping structure 15 or a position near the rear wheel house 4 from the damping structure 15 (more specifically, as illustrated in FIG. 3, arranged at the position in the same height as or lower than the damping structure 15). In such a case, the vibration that is concentrated on the interrupting section 7e can reliably be dampened by the damping structure 15 without being dispersed.

(2)

In the vehicle body structure of this embodiment, the vibration source is the rear wheel house 4 that accommodates the rear wheel.

Thus, it is possible to improve the rigidity of the vehicle body 1 around the rear wheel house 4 and to further efficiently suppress the vibrations, which are generated in the rear wheel house 4 during the travel of the vehicle and are transmitted along the inner rein 7 and the outer rein 8, by the damping structure 15 as the damping section.

(3)

In the vehicle body structure of this embodiment, the component is the side plate 6 that constitutes the side surface of the vehicle body 1. The first portion of the vibration source is the wheel house inner 4a that is arranged on the inner side of the vehicle body 1 in the rear wheel house 4. The first reinforcing member is the inner rein 7 that is coupled to the wheel house inner 4a and an inner surface of the side plate 6.

With such a configuration, on the inner side of the vehicle body 1, the vibration that is generated in the rear wheel house 4 is transmitted along the inner rein 7 as the first reinforcing member, is interrupted by the interrupting section 7e in the intermediate portion of the meeting section 14, and is thus dampened by the damping structure 15 near the interrupting section 7e. As a result, it is possible to further efficiently suppress the vibration while suppressing a vibration transmission range on the inside of the vehicle cabin.

(4)

In the vehicle body structure of this embodiment, the outer rein 8 constitutes the outer-side closed cross-sectional structure 19 with the side plate 6. The damping section is formed with the damping structure 15 that is formed in the outer-side closed cross-sectional structure 19. The damping structure 15 includes: the coupling member 16 that is coupled to the inner surface of the outer rein 8; and the vibration damping member 17 that is interposed between the coupling member 16 and the side plate 6 to dampen the vibration.

With such a configuration, the outer rein 8 constitutes the outer-side closed cross-sectional structure 19 with the side plate 6. Thus, it is possible to further improve the rigidity of the vehicle body 1. In addition, in the outer-side closed cross-sectional structure 19, the vibration that is transmitted along the outer rein 8 is transmitted to the vibration damping member 17 via the coupling member 16 in the damping structure 15 constituting the damping section, and is efficiently dampened by the vibration damping member 17. As a result, it is possible to further improve the rigidity of the vehicle body 1 and achieve further efficient dampening.

In this embodiment, in addition to the outer-side closed cross-sectional structure 19, the inner rein 7 constitutes the inner-side closed cross-sectional structure 18 with the side plate 6. Thus, the rigidity of the vehicle body 1 is further improved by these two closed cross-sectional structures 18, 19 on the inner and outer sides of the vehicle.

(5)

In the vehicle body structure of this embodiment, together with the side plate 6, the inner rein 7 as the first reinforcing member constitutes the vehicle width direction annular structure A1 that has the annular closed cross-sectional structure when seen from front of the vehicle body 1. Together with the side plate 6, the outer rein 8 as the second reinforcing member constitutes the vehicle longitudinal direction annular structure A2 that has the annular closed cross-sectional structure when seen in the side view of the vehicle body 1. On the far side (the upper side) in the meeting section 14 from the rear wheel house 4, the vehicle body structure has the rear pillar 9 as the shared portion that is shared by the vehicle width direction annular structure A1 and the vehicle longitudinal direction annular structure A2.

With such a configuration, the two annular structure sections (the vehicle width direction annular structure A1 and the longitudinal annular structure A2), which are formed with the annular closed cross-sectional structures, are formed in the vehicle body 1. Thus, the rigidity of the vehicle body 1 is further improved. In addition, since the rear pillar 9 as the shared portion by these two annular structure sections is positioned on the far side in the meeting section 14 from the rear wheel house 4. Thus, it is possible to reliably suppress the transmission of the vibration from the rear wheel house 4 to the rear pillar 9 as the shared portion by the damping structure 15 provided in the meeting section 14. Furthermore, in the two annular structure sections (the vehicle width direction annular structure A1 and the longitudinal annular structure A2), the vibrations are dampened in the common damping structure 15. Thus, it is possible to further efficiently dampen the vibrations.

(6)

In the vehicle body structure of this embodiment, the rear pillar 9 as the shared portion is configured to be positioned above the lower end 20a of the quarter window opening 20 that is formed in the side portion of the vehicle body 1. Thus, in the vehicle cabin, it is possible to prevent the transmission of the vibration to ears of the occupant.

Modified Examples (A)

In the above embodiment, the damping structure 15 is adopted as the damping section that dampens the vibrations transmitted along the inner rein 7 (the first reinforcing member) and the outer rein 8 (the second reinforcing member). However, the present disclosure is not limited thereto. In the present disclosure, a component that can dampen the vibrations transmitted along the two reinforcing members can be adopted as the damping section in the present disclosure. For example, instead of the damping structure 15, an elastic member, such as rubber, or a component having damping performance, such as a hydraulic damper, that is provided to couple the two reinforcing members can also be adopted as the damping section.

(B)

In the above embodiment, the example in which the first reinforcing member having the interrupting section is the inner rein 7 and the second reinforcing member is the outer rein 8. However, the present disclosure is not limited thereto. The configuration may be opposite, that is, the first reinforcing member having the interrupting section may be the outer rein 8 and the second reinforcing member may be the inner rein 7. In such a case, it is also possible to exert the same operational effects as those in above (1). However, the configuration of the above embodiment in which the first reinforcing member having the interrupting section is the inner rein 7 can suppress the transmission of the vibration to the upper side on the inside of the vehicle cabin, and thus is preferred in a point that the vibration suppression on the inside of the vehicle cabin can be achieved.

(C)

Furthermore, in the above embodiment description has been made on the example of the rear wheel house as the vibration source. However, the present disclosure is not limited thereto. Thus, the vibration source of the present disclosure only needs to generate the vibration in the vehicle, and may be a front wheel house, a transmission, a gear box, the engine (a member surrounding the engine), or the like.

The invention claimed is:

1. A vehicle body structure comprising:
a first reinforcing member coupled to a first portion of a vibration source in a vehicle and a component constituting a vehicle body;
a second reinforcing member coupled to the component and a second portion different from the first portion of the vibration source;
a meeting section where vibration transmitted along the first reinforcing member and vibration transmitted along the second reinforcing member meet; and
a damping section arranged in the meeting section and configured to dampen the vibrations transmitted along the first reinforcing member and the second reinforcing member, wherein
the first reinforcing member has an interrupting section that interrupts transmission of the vibration transmitted along the first reinforcing member in an intermediate portion of the meeting section, and is connected to the second reinforcing member via the damping section.

2. The vehicle body structure of claim 1, wherein the interrupting section is arranged at a same position as the damping section.

3. The vehicle body structure of claim 1, wherein the interrupting section is arranged at a position closer to the vibration source in relation to the damping section.

4. The vehicle body structure of claim 1, wherein the vibration source is a rear wheel house that accommodates a rear wheel.

5. The vehicle body structure of claim 4, wherein the component is a side plate that constitutes a side surface of the vehicle body, and the first portion is a wheel house inner arranged on an inner side of the vehicle body in the rear wheel house.

6. The vehicle body structure of claim 5, wherein the first reinforcing member is an inner rein coupled to the wheel house inner and an inner surface of the side plate.

7. The vehicle body structure of claim 1, wherein the second reinforcing member constitutes a closed cross-sectional structure with the component,
the damping section is formed with a damping structure formed in the closed cross-sectional structure, and includes:
a coupling member fixed to an inner surface of the second reinforcing member; and
a vibration damping member interposed between the coupling member and the component to dampen the vibration.

8. The vehicle body structure according to claim 1, wherein
with the component, the first reinforcing member constitutes a first annular structure section having an annular closed cross-sectional structure when seen from front of the vehicle body,
with the component, the second reinforcing member constitutes a second annular structure section having an annular closed cross-sectional structure in a side view of the vehicle body, and
a shared portion shared by the first annular structure section and the second annular structure section is provided on an opposing side in the meeting section from the vibration source.

9. The vehicle body structure of claim 8, wherein the shared portion is located above a lower end of a side window opening formed in a side portion of the vehicle body.

10. A vehicle body structure comprising:
an inner rein coupled to a first portion of a vibration source in a vehicle and a component constituting a vehicle body;
an outer rein coupled to the component and a second portion different from the first portion of the vibration source; and
a damping structure arranged between the inner rein and the outer rein and configured to dampen vibrations transmitted along the inner rein and the outer rein, wherein
the inner rein includes a portion that interrupts transmission of the vibration transmitted along the inner rein, and is connected to the second reinforcing member via the damping structure.

11. The vehicle body structure of claim 10, wherein the portion of the inner rein that interrupts transmission of the vibration transmitted along the inner rein is arranged at a same position as the damping structure.

12. The vehicle body structure of claim 10, wherein the portion of the inner rein that interrupts transmission of the vibration transmitted along the inner rein is arranged at a position closer to the vibration source in relation to the damping structure.

13. The vehicle body structure of claim 10, wherein the vibration source is a rear wheel house that accommodates a rear wheel.

14. The vehicle body structure of claim 13, wherein the component is a side plate that constitutes a side surface of the vehicle body, and
the first portion is a wheel house inner arranged on an inner side of the vehicle body in the rear wheel house.

15. The vehicle body structure of claim 14, wherein the inner rein is coupled to the wheel house inner and an inner surface of the side plate.

16. The vehicle body structure of claim 10, wherein the outer rein constitutes a closed cross-sectional structure with the component,
the damping structure is formed in the closed cross-sectional structure, and includes:
a coupling member fixed to an inner surface of the outer rein; and
a vibration damping member interposed between the coupling member and the component to dampen the vibration.

17. The vehicle body structure according to claim 1, wherein
with the component, the inner rein constitutes a first annular structure having an annular closed cross-sectional structure when seen from front of the vehicle body,
with the component, the outer rein constitutes a second annular structure having an annular closed cross-sectional structure in a side view of the vehicle body, and
a portion shared by the first annular structure and the second annular structure is provided on an opposing side from the vibration source from a position where the component, inner rein and outer rein meet.

18. The vehicle body structure of claim 17, wherein the shared portion is located above a lower end of a side window opening formed in a side portion of the vehicle body.

19. A vehicle comprising:
a body structure including
an inner rein coupled to a first portion of a vibration source in a vehicle and a component constituting a vehicle body;

an outer rein coupled to the component and a second portion different from the first portion of the vibration source; and a damping structure arranged between the inner rein and the outer rein and configured to dampen vibrations transmitted along the inner rein and the outer rein, wherein the inner rein includes a portion that interrupts transmission of the vibration transmitted along the inner rein, and is connected to the second reinforcing member via the damping structure.

* * * * *